(12) United States Patent
Choi

(10) Patent No.: US 9,392,165 B2
(45) Date of Patent: Jul. 12, 2016

(54) ARRAY CAMERA, MOBILE TERMINAL, AND METHODS FOR OPERATING THE SAME

(71) Applicant: LG ELECTRONICS INC., Seoul (KR)

(72) Inventor: Ji Youn Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/441,958

(22) PCT Filed: Apr. 16, 2013

(86) PCT No.: PCT/KR2013/003198
§ 371 (c)(1),
(2) Date: May 11, 2015

(87) PCT Pub. No.: WO2014/073756
PCT Pub. Date: May 15, 2014

(65) Prior Publication Data
US 2015/0304557 A1     Oct. 22, 2015

(30) Foreign Application Priority Data

Nov. 12, 2012   (KR) .................. 10-2012-0127469

(51) Int. Cl.
*H04N 5/232* (2006.01)
*H04N 5/225* (2006.01)
*H04N 5/262* (2006.01)
*H04N 5/265* (2006.01)

(52) U.S. Cl.
CPC ......... *H04N 5/23232* (2013.01); *H04N 5/2258* (2013.01); *H04N 5/23293* (2013.01); *H04N 5/265* (2013.01); *H04N 5/2621* (2013.01); *H04N 5/23216* (2013.01)

(58) Field of Classification Search
CPC ................................. H04N 5/25232
See application file for complete search history.

(56) References Cited

U.S. PATENT DOCUMENTS

| | | | |
|---|---|---|---|
| 8,553,134 B2 * | 10/2013 | Shimizu | H04N 5/2171 348/222.1 |
| 2006/0125921 A1 | 6/2006 | Foote | |
| 2008/0246840 A1 | 10/2008 | Larson et al. | |
| 2009/0046197 A1 * | 2/2009 | Ishijima | H04N 5/23219 348/346 |
| 2011/0109748 A1 | 5/2011 | Lee et al. | |
| 2012/0188391 A1 | 7/2012 | Smith | |
| 2013/0258044 A1 * | 10/2013 | Betts-Lacroix | H04N 13/0242 348/36 |

FOREIGN PATENT DOCUMENTS

KR     10-2011-0037738 A     4/2011

OTHER PUBLICATIONS

International Search Report dated Aug. 28, 2013 issued in Application No. PCT/KR2013/003198.

* cited by examiner

*Primary Examiner* — James Hannett
(74) *Attorney, Agent, or Firm* — KED & Associates LLP

(57) ABSTRACT

An array camera, a mobile terminal, and methods for operating the same are disclosed. The method for operating an array camera having a plurality of camera modules includes acquiring images through the plurality of camera modules, grouping the acquired images into a first group and a second group by comparing the acquired images, and generating a composite image using images of the first group.

12 Claims, 15 Drawing Sheets

(a)

(b)

(c)

(d)

(a)

(b)

(c)

(d)

(a)

(b)

(a)　　　　　　　　　(b)

(a)　　　　　　　　　　　　(b)

ARRAY CAMERA, MOBILE TERMINAL, AND METHODS FOR OPERATING THE SAME

CROSS-REFERENCE TO RELATED PATENT APPLICATIONS

This application is a U.S. National Stage Application under 35 U.S.C. §371 of PCT Application No. PCT/KR2013/003198, filed Apr. 16, 2013, which claims priority to Korean Patent Application No. 10-2012-0127469 filed Nov. 12, 2012, whose entire disclosures are hereby incorporated by reference.

TECHNICAL FIELD

The present invention relates to an array camera, a mobile terminal, and methods for operating the same, and more particularly, to an array camera, a method for operating the array camera, a mobile terminal having the array camera, and a method for operating the mobile terminal.

BACKGROUND ART

Cameras that acquire specific images, that is, a video and images by capturing an object have been miniaturized. Thus, more and more digital devices such as mobile terminals, Personal Digital Assistants (PDAs), laptops, image display devices, etc. are equipped with cameras.

Along with the trend toward small size and slim-down, intensive research has been conducted on methods for acquiring and recovering high-quality images.

A mobile terminal is a portable device capable of performing one or more of a voice call and video call function, an information input/output function, and a data storing function, while being carried with a user. Along with the diversification of its functions, the mobile terminal has evolved to an integrated multimedia player having complex functions such as picture-taking, video recording, playback of music or a video, gaming, broadcasting reception, and wireless Internet.

To implement complex functions in such a mobile terminal developed into a multimedia player, new attempts have been made in terms of hardware or software. For example, a User Interface (UI) environment is built to render function search or function selection user-friendly.

Furthermore, research is being conducted on efficient utilization and management of pictures or a video captured with a mobile terminal.

DISCLOSURE OF INVENTION

Technical Problem

An object of the present invention devised to solve the problem lies on an array camera which can be miniaturized and acquire high-quality images, and a method for operating the same.

Another object of the present invention devised to solve the problem lies on a mobile terminal having an array camera and a method for operating the same, which can increase user convenience.

Solution to Problem

The object of the present invention can be achieved by providing a method for operating an array camera having a plurality of camera modules, including acquiring images through the plurality of camera modules, grouping the acquired images into a first group and a second group by comparing the acquired images, and generating a composite image using images of the first group.

In another aspect of the present invention, provided herein is a method for operating a portable terminal having an array camera with a plurality of camera modules, including acquiring images through the plurality of camera modules, grouping the acquired images into a first group and a second group by comparing the acquired images, and generating a composite image using images of the first group.

In another aspect of the present invention, provided herein is a method for operating an array camera having a plurality of camera modules, including acquiring images through the plurality of camera modules, generating a preview image using an image acquired through a reference camera module among the plurality of camera modules, displaying the preview image on a display, detecting a blind-state camera module by comparing the image acquired through the reference camera module with images acquired through the other camera modules, and displaying a warning message on the display, upon detection of the blind-state camera module.

In a further aspect of the present invention, provided herein is a method for operating a mobile terminal having an array camera with a plurality of camera modules, including acquiring images through the plurality of camera modules, generating a preview image using an image acquired through a reference camera module among the plurality of camera modules, displaying the preview image on a display, detecting a blind-state camera module by comparing the image acquired through the reference camera module with images acquired through the other camera modules, and displaying a warning message on the display, upon detection of the blind-state camera module.

Advantageous Effects of Invention

According to the present invention, a high-quality image can be acquired by capturing various images through a plurality of cameras and combining the captured images. In addition, if a camera is covered, the camera is easily identified. Therefore, user convenience can be increased.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Embodiments of the present invention will be described below with reference to the attached drawings.

The terms "module" and "unit" used to signify components are used herein to help the understanding of the components and thus they should not be considered as having specific meanings or roles. Accordingly, the terms "module" and "unit" may be used interchangeably.

Figure 1:
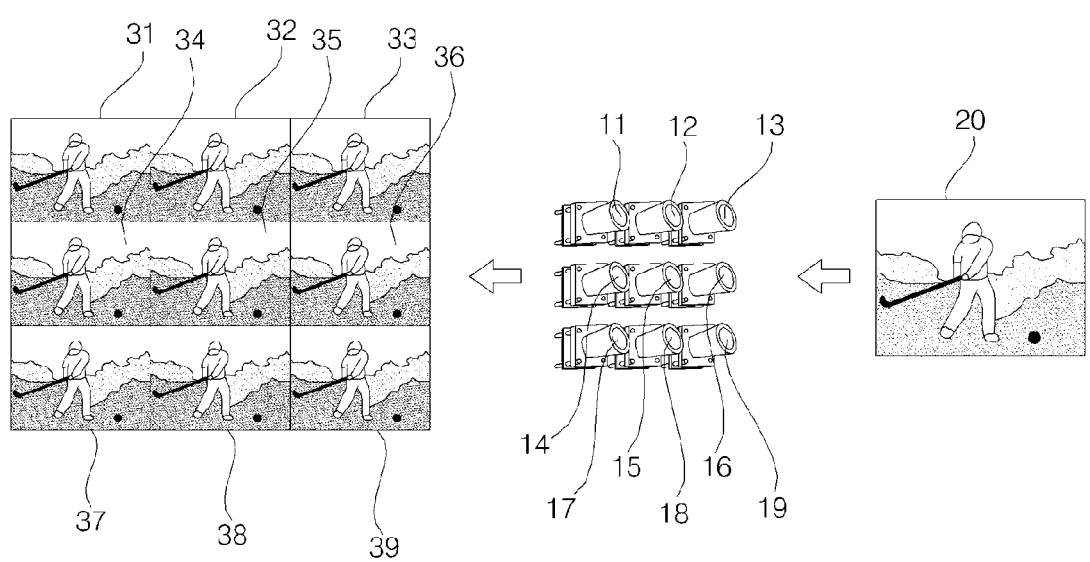
FIG. 1 is a view referred to for describing an array camera and a method for operating the array camera according to an embodiment of the present invention.

FIG. 1 is a view referred to for describing an array camera and a method for operating the array camera according to an embodiment of the present invention.

Referring to FIG. 1, an array camera may include a plurality of camera modules 11 to 19. The plurality of camera modules 11 to 19 may be arranged in an M×N matrix (M and N are 1 or larger integers).

The array camera may acquire still images and a video, that is, images and video data by capturing a specific object with the plurality of camera modules 11 to 19 which may be controlled independently and may capture an image independently.

For example, when the array camera captures a specific object 20, it may acquire a plurality of images 31 to 39 by capturing the same object 20 simultaneously or at predetermined different time points with the plurality of camera modules 11 to 19.

In addition, the array camera may generate a high-quality composite image by combining the acquired images 31 to 39 using at least one of various image combining algorithms.

While the array camera is shown in FIG. 1 as including nine camera modules arranged in a 3×3 matrix, by way of example, the present invention is not limited to the specific example and thus the number and layout of camera modules included in the array camera may vary.

Figure 2:
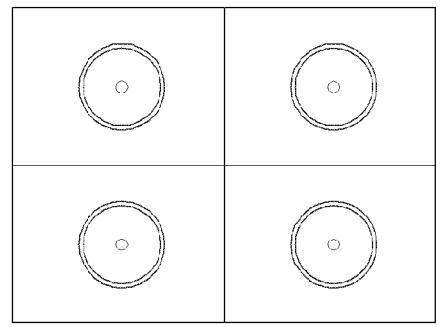
FIG. 2 illustrates exemplary various layouts of the array camera according to the present invention.
Figure 2:
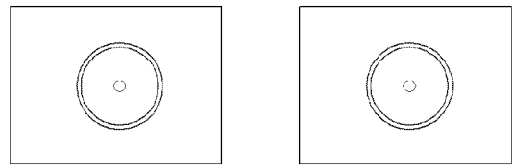
Figure 2:
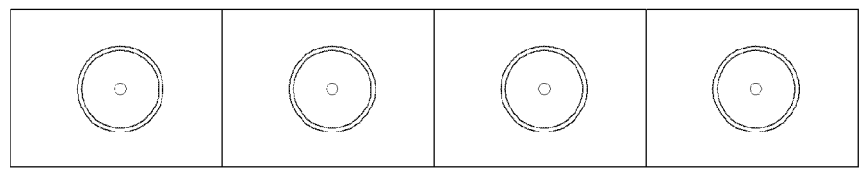
Figure 2:
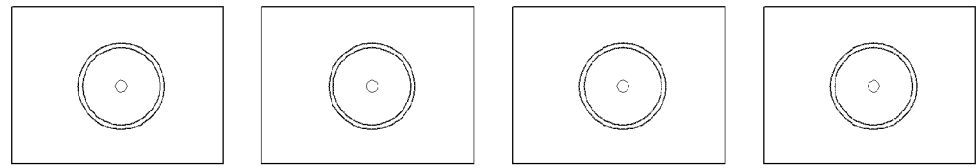

FIG. 2 illustrates exemplary various layouts of the array camera according to the present invention. Specifically, in the case where the array camera includes four camera modules, the camera modules may be arranged in the layouts illustrated in FIG. 2.

In FIG. 2(a), the four camera modules are arranged in a 2×2 matrix. In FIG. 2(b), the four camera modules are arranged in a 2×2 matrix, apart from one another by a predetermined distance.

The four camera modules are arranged in a 1×4 matrix in FIG. 2(c). Although the four camera modules are arranged in a 1×4 matrix, they are spaced from one another by a predetermined distance in FIG. 2(d).

Unlike the layouts of the array camera illustrated in FIG. 2, the four camera modules may be arranged in a 4×1 matrix.

Figure 3:
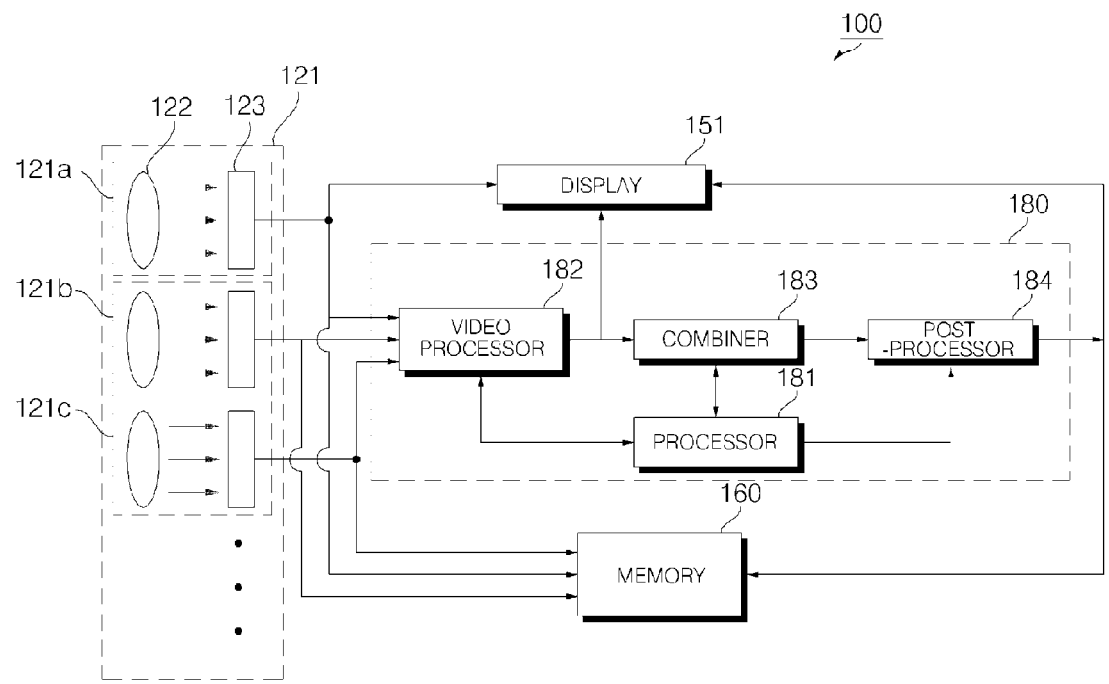
FIG. 3 is a block diagram of the array camera according to an embodiment of the present invention.
Figure 4:
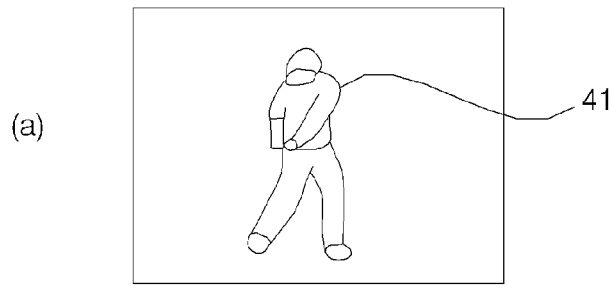
FIGS. 4 and 5 are views referred for describing an array camera and a method for operating the array camera according to an embodiment of the present invention.
Figure 4:
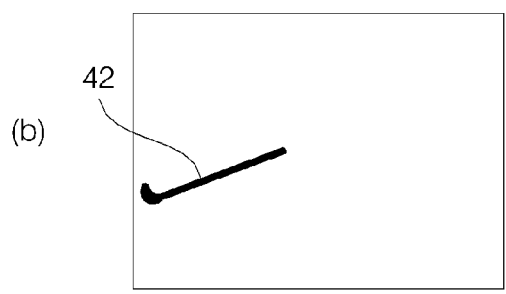
Figure 4:
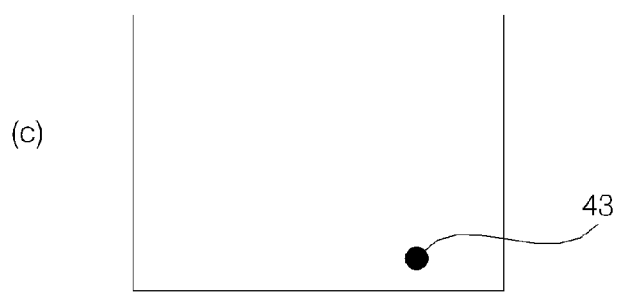
Figure 4:
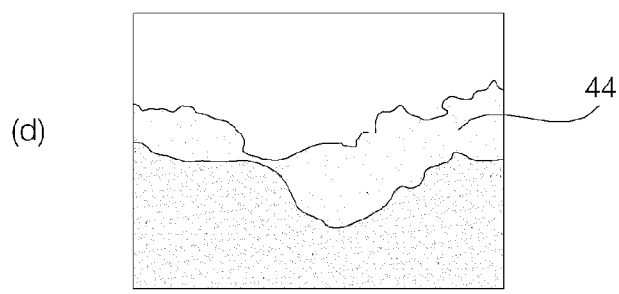
Figure 5:
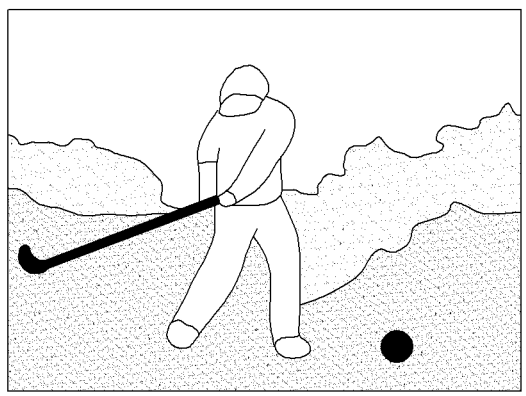

FIG. 3 is a block diagram of the array camera according to an embodiment of the present invention and FIGS. 4 and 5 are views referred for describing the array camera and a method for operating the array camera according to an embodiment of the present invention.

Referring to FIG. 3, the configuration of an array camera 100 will be described, focusing on components related to image acquisition and image processing. The array camera 100 may include a plurality of camera modules 121, a display 151, a memory 160, and a controller 180. The array camera 100 may further include other components, when needed. For example, the array camera 100 may further include a user input unit (not shown) for receiving a user input and an interface (not shown) for interfacing between the array camera 100 and other electronic devices.

In real implementation, two components may be incorporated into a single component or one component may be separated into two or more components in the array camera 100, when needed.

The camera modules 121 are a plurality of independently controllable camera modules 121a, 121b, 121c, . . . in the present invention. Various known camera modules are available as the camera modules 121a, 121b, 121c, . . .

Each of the camera modules 121a, 121b, 121c, . . . may include a lens unit 122 and a camera sensor 123.

A user-captured image of an object may be formed on the camera sensor 123 by light collected through the lens unit 122. The camera sensor 123 may function to convert an external image input through the lens unit 122 to image data. For example, the camera sensor 123 may be a Charge Coupled Device (CCD) sensor, a Complementary Metal-Oxide Semiconductor (CMOS) sensor, etc. to which the present invention is not limited.

The camera sensor 123 may operate in normal mode or fast mode. The camera sensor 123 may capture a video in a general manner in the normal mode, while it may capture a video at a fast or ultra-fast pace. Or the camera sensor 123 may operate in a mode in which pictures can be taken at a predetermined number of frames per second.

The lens unit 122 may include a plurality of lenses.

Since resolution increases in proportion to the diameter of a lens, a lens with a larger diameter offers a higher resolution. However, the resulting increase in focal distance makes it difficult to render a camera module small and slim.

On the contrary, a lens with a small diameter is favorable in producing a small, slim camera module, but makes it difficult to obtain a high-resolution, high-quality image.

However, including a plurality of camera modules, the array camera 100 of the present invention can acquire a high-quality image by combining a plurality of images captured with the plurality of camera modules. Therefore, relatively small lenses can be used. Consequently, the camera modules can be made small and slim.

In accordance with an embodiment of the present invention, the lens unit 122 of at least one of the plurality of camera modules 121 may include a lens different from those of the other camera modules 121 in type, magnification, and size.

The controller 180 provides overall control to the array camera 100. The controller 180 may receive image data from each of the camera modules 121 and process the image data.

Referring to FIG. 3, the controller 180 may include a processor 181 for controlling the overall operation of the controller 180, a video processor 182 for processing data received from the plurality of camera modules 121, a combiner 183 for combining a plurality of images or pictures, and a post-processor 184 for processing images or pictures to display or store a composite image or picture.

The video processor 182 may convert analog video data received from the camera sensors 123 to digital video data.

For example, the camera sensors 123 may acquire video frames being electrical analog video data by capturing an object. Each of the video frames may include a plurality of pixels and information about each pixel. The video processor 182 may process the per-pixel information during analog-to-digital video data conversion.

The video processor 182 or the post-processor 184 may perform video processes to enhance video quality, inclusive of color correction, color enhancement, gamma correction, etc.

The combiner 183 may perform main video processing such as image interpretation, image recognition, image effect processing, etc. under the control of the processor 181. For image recognition, the combiner 183 may perform object extraction, area extraction, face recognition, scene recognition, etc. In addition, the combiner 183 may combine a plurality of images.

The combiner 183 may reside in the processor 181.

The display 151 may display the operation state of the array camera 100, a manipulated screen, etc.

The display 151 may receive data to be displayed from the controller 180 and may display a final image or preview image based on the received data.

Or the display 151 may display an image received from a preset reference camera module 121a among the plurality of camera modules 121 as a preview image according to a setting.

The controller 180 may control use of at least two of the camera modules 121 as a stereoscopic camera capable of capturing an object three-dimensionally.

The controller 180 may create a depth map by processing a plurality of images acquired with the plurality of camera modules 121. The depth map may be used as reference data for effective image combination as well as for three-dimensional (3D) imaging.

In accordance with an embodiment of the present invention, the controller 180 may identify objects from image data by a known image analysis technique. The controller 180 may analyze at least one of the edge, size, color, brightness, and motion property of an object included in a plurality of images. These parameters may correspond to depth cues.

Motion properties may be checked, such as the colors, brightness, clearness, and sizes of an object and a background and presence of an image motion in the object and background.

The time order of objects may also be determined. The time order of non-overlapped objects displayed on the same screen as well as overlapped objects may be used in setting depth values during two-dimension (2D) to 3D conversion or in combining images.

The depth cues are a factor by which a perspective inherent to a 2D image may be determined. The controller 180 may generate a depth map based on the depth cues.

For example, the depth cues are divided into static cues including texture gradient, linear perspective, atmospheric perspective, and shading and dynamic cues including motion parallax and kinetic depth effect.

The controller 180 may control the plurality of camera modules 121 to automatically focus on different objects.

The controller 180 may extract objects from a plurality of images. In the example of FIG. 1 illustrating a plurality of images, a person 41, a golf club 42, a golf ball 43, and a background 44 may be extracted as illustrated in FIG. 4. The controller 180 may combine the extracted objects into a composite image as illustrated in FIG. 5.

The controller 180 may refer to the depth map in combining the objects.

Or the controller 180 may select a focus from the plurality of images, generate a depth map based on the focus, and combine the plurality of images using the depth map.

Or the controller 180 may use various image combining techniques including High Dynamic Range (HDR) photography.

The controller 180 illustrated in FIG. 3 is purely exemplary. Each component of the controller 180 may be configured separately outside the controller 180. It is also possible to implement the components of the controller 180 as a program.

Two or more components of the controller 180 may be incorporated into a single component, or one component of the controller 180 may be separated into two or more components. In addition, a new component which is not illustrated in FIG. 3 may be added to the controller 180.

The memory 160 may store a program required for operating the array camera 100 and data obtained during operations of the array camera 100. When needed, the array camera 100 may be provided with a buffer for temporarily buffering data.

Figure 6:
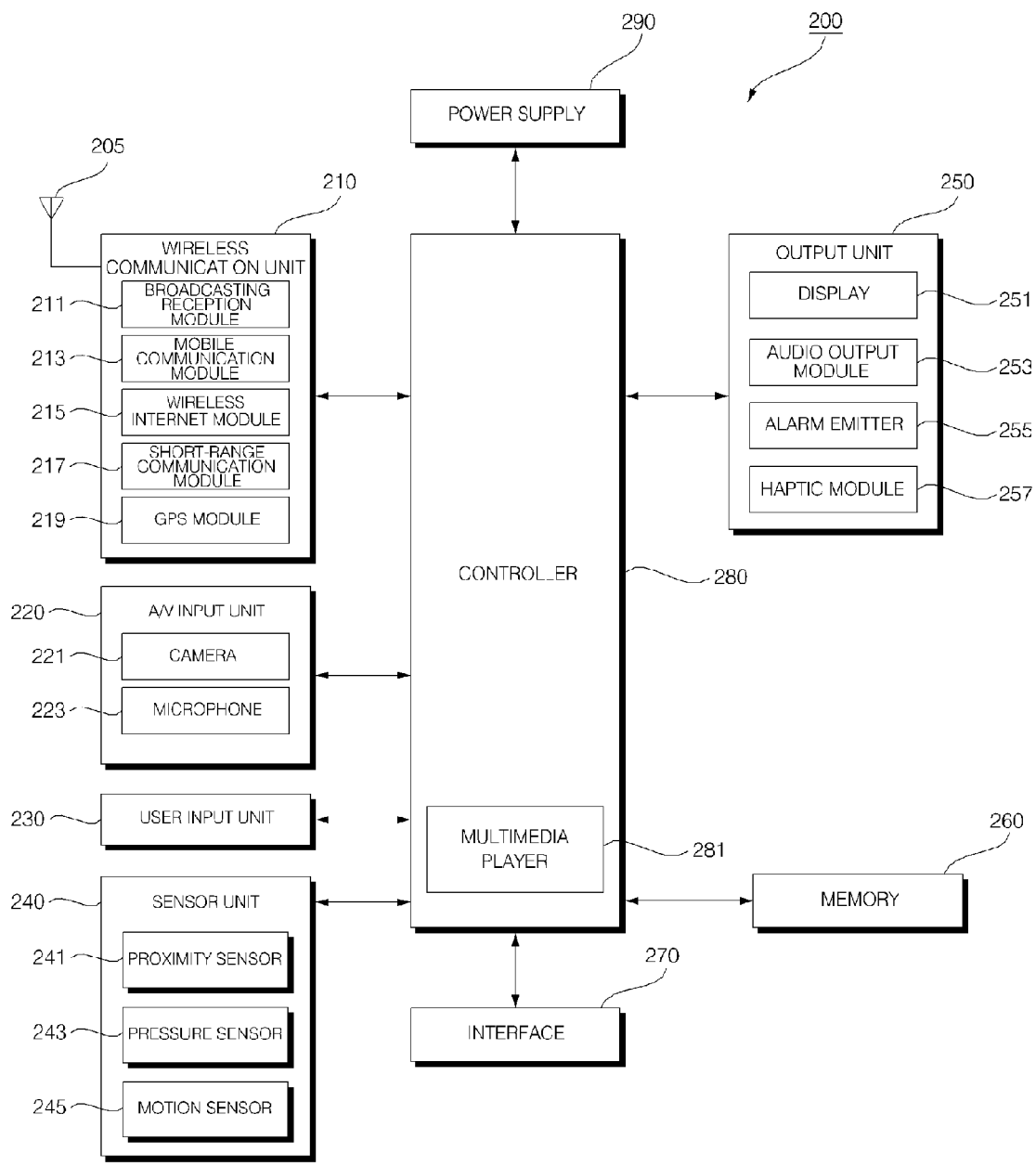
FIG. 6 is a block diagram of a mobile terminal according to an embodiment of the present invention.

FIG. 6 is a block diagram of a mobile terminal according to an embodiment of the present invention.

A mobile terminal as set forth herein may be any of a portable phone, a smart phone, a laptop computer, a digital broadcast terminal, a Personal Digital Assistant (PDA), a Portable Multimedia Player (PMP), a camera, a navigator, a tablet computer, an e-book reader, etc.

With reference to FIG. 6, functional components of the mobile communication terminal will be described below.

Referring to FIG. 6, a mobile terminal 200 may include a wireless communication module 210, an Audio/Video (A/V) input unit 220, a user input unit 230, a sensor unit 240, an output unit 250, a memory 260, an interface 270, a controller 280, and a power supply 290. Two or more components of the mobile terminal 200 may be combined into a single component or a single component thereof may be separated into two or more components in alternative embodiments. For example, a camera 211, particularly an array camera may reside in the A/V input unit 220. Or the array camera 221 may be configured separately from the A/V input unit 220.

The wireless communication module 210 may include a broadcasting reception module 211, a mobile communication module 213, a wireless Internet module 215, a short-range communication module 217, and a Global Positioning System (GPS) module 219.

The broadcasting reception module 211 receives at least one of a broadcast signal or broadcasting-related information on a broadcast channel from an external broadcasting management server. The broadcast channel may be any of a satellite channel, a terrestrial channel, etc. The broadcasting management server may refer to a server for generating and transmitting at least one of a broadcast signal or broadcasting-related information or a server for receiving at least one of an already generated broadcast signal or already generated broadcasting-related information and providing the received at least one of the broadcast signal or the broadcasting-related information to terminals.

The broadcast signal may be a TV broadcast signal, a radio broadcast signal, a data broadcast signal, or a combination of the TV broadcast signal and the data broadcast signal or the radio broadcast signal and the data broadcast signal. The broadcasting-related information may be information related to a broadcast channel, a broadcast program, or a broadcast service provider. The broadcasting-related information may be provided over a mobile communication network. In this case, the mobile communication module 213 may receive the broadcasting-related information. The broadcasting-related information may take various forms.

The broadcasting reception module 211 may receive a broadcast signal through a broadcasting system, particularly a digital broadcast signal through a digital broadcasting system such as Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), or Integrated Services Digital Broadcast-Terrestrial (ISDB-T). The broadcasting reception module 211 may be adapted to all other broadcasting systems that provide broadcast signals as well as the digital broadcasting system. The broadcast signal and/or broadcasting-related information received at the broadcasting reception module 211 may be stored in the memory 260.

The mobile communication module 213 transmits a radio signal to and receives a radio signal from at least one of a Base Station (BS), an external terminal, or a server over a mobile communication network. The radio signal may include a voice call signal, a video call signal, or text/other various types of data involved in multimedia message transmission and reception.

The wireless Internet module 215 is a built-in or external module for providing wireless Internet connectivity to the mobile terminal 200. The wireless Internet module 215 may operate in conformance to Wireless Local Area Network (WLAN) (Wireless Fidelity (WiFi)), Wireless broadband (Wibro), World Interoperability for Microwave Access (WiMAX), High Speed Downlink Packet Access (HSDPA), etc.

The short-range communication module 217 is used for short-range communication. For short-range communication, the short-range communication module 217 may conform to Bluetooth, Radio Frequency Identification (RFID), Infrared Data Association (IrDA), Ultra WideBand (UWB), ZigBee, Near Field Communication (NFC), etc.

The GPS module 219 receives location information from a plurality of GPS satellites.

The A/V input unit 220 is used to receive an audio signal or a video signal and may include the camera 221 and a microphone 223. The camera 221 processes a video frame of a still image or video acquired from an image sensor in video call mode or camera mode. The processed video frame may be displayed on a display 251.

The camera 221 may be an array camera including a plurality of camera modules that can be independently controlled and can acquire images independently.

The video frame processed by the camera 221 may be stored in the memory 260 or transmitted externally through the wireless communication module 210. Two or more cameras 221 may be provided to the mobile terminal 200 depending on the configuration specification of the mobile terminal 200. For example, the cameras 221 may be provided on the front and rear surfaces of the mobile terminal 200. In this case, at least one of the front and rear cameras 221 may be an array camera. Especially, the rear camera is preferably an array camera in order to acquire a high-quality image.

The microphone 223 receives an external audio signal and processes the audio signal to electrical voice data in call mode, recording mode, or voice recognition mode. In the call mode, the processed voice data may be converted to a format transmittable to a BS and output through the mobile communication module 213. Various noise cancellation algorithms are available to the microphone 223 in order to eliminate noise introduced during input of an external audio signal.

The user input unit 230 generates key input data that the user inputs to control the operation of the mobile terminal 200. The user input unit 230 may include a keypad, a dome switch, a (resistive/capacitive) touch pad, etc. to receive a command or information through the user's push or touch manipulation. The user input unit 230 may be configured to operate in a jog wheel or jog fashion involving key rotation, in a joy stick fashion, or in a finger mouse fashion. Especially when a touch pad is layered with the display 251, the resulting structure may be referred to as a touch screen.

The sensor unit 240 senses the current state of the mobile communication terminal 200, such as the open or closed state, position, or user touch of the mobile terminal 200 and generates a sensing signal to control the operation of the mobile terminal 200 according to the sensed state. For example, if the mobile terminal 200 is a sliding phone, the sensor unit 240 may sense whether the sliding phone is opened or closed. In addition, the sensor unit 240 may sense whether the power supply 290 is supplying power or whether the interface 270 is coupled with an external device.

The sensor unit 240 may include a proximity sensor 241, a pressure sensor 243, and a motion sensor 245. The proximity sensor 241 may detect an object approaching the mobile terminal 200 or the existence or absence of an object in the vicinity of the mobile terminal 200 without mechanical contact. The proximity sensor 241 may detect a nearby object based on a change in an alternating or static magnetic field or the variation rate of capacitance. The sensor unit 240 may also sense a surface of the mobile terminal 200 that the user grips. One or more proximity sensors 241 may be provided to the mobile terminal 200 depending on the specification of the mobile terminal 200.

The pressure sensor 243 may determine whether pressure is applied to the mobile terminal 200 and how strong the pressure is. The pressure sensor 243 may be installed at a part of the mobile terminal 200 requiring pressure detection according to the environment in which the mobile terminal 200 is used.

If the pressure sensor 243 is installed on the display 251, a touch input on the display 251 may be identified from a pressed touch input on the display 151, for which a stronger pressure is applied than for the touch input, according to a signal output from the pressure sensor 243. In addition, in case of the pressed touch input, the magnitude of pressure applied to the display 251 may also be known from the signal output from the pressure sensor 243.

If the pressure sensor 243 is disposed at an edge of the mobile terminal 200, the pressure sensor 243 may sense a surface of the mobile terminal 200 that the user grips by detecting pressure.

The motion sensor 245 senses the position or motion of the mobile terminal 200 using an acceleration sensor, a gyro sensor, etc. The acceleration sensor is a device that converts an acceleration change in a direction to an electrical signal. Along with the development of the Micro-ElectroMechanical System (MEMS) technology, acceleration sensors have become popular.

There are a broad range of acceleration sensors from an acceleration sensor that measures a large acceleration value for sensing collision in an airbag system for a vehicle to an acceleration sensor that measures a very small acceleration value for use as input means capable of recognizing fine hands' motions when a game is played. Typically, 2- or 3-axis acceleration sensors are packed into one package or a single z-axis acceleration sensor is used depending on use environments. Accordingly, when not a Z-axis acceleration sensor but an X-axis or Y-axis acceleration sensor is to be used, the acceleration sensor may be erected on a main substrate by means of a substrate fragment.

The gyro sensor measures an angular velocity and thus senses a rotated direction with respect to a reference direction.

The sensor unit 240 may include sensors for user authentication. For example, when user authentication is performed using vital information about a user, the sensor unit 240 may include a sensor for recognizing a body temperature, finger print, iris, face, etc. The sensor unit 240 may include a necessary sensor according to a user authentication method set for the mobile terminal 200.

The output unit 250 outputs an audio signal, a video signal, or an alarm signal. The output unit 250 may include the display 251, an audio output module 253, an alarm emitter 255, and a haptic module 257.

The display 251 displays information processed in the mobile terminal 200. For example, when the mobile terminal 200 is in the call mode, the display 251 displays a UI or Graphical User Interface (GUI) related to a call. In the video call mode or the camera mode, the display 251 may display captured or received images separately or simultaneously and may also display a UI or GUI.

As described before, if a touch screen is configured by layering the display 251 with a touch pad, the display 251 may be used not only as an output device but also as an input device capable of receiving information by a user's touch.

If the display 251 is configured into a touch screen, it may include a touch screen panel, a touch screen panel controller, etc. In this case, the touch screen panel, which is a transparent panel attached on the exterior of the touch screen, may be connected to an internal bus of the mobile terminal 200. The touch screen panel keeps monitoring whether it is touched by a user. Upon detection of a touch input, the touch screen panel provides a signal corresponding to the touch input to the touch screen panel controller. The touch screen panel controller processes the received signal into data and transmits the data to the controller 280 so that the controller 280 may determine the presence or absence of a touch input and may locate a touched point on the touch screen.

The display 251 may be configured into electronic paper (e-paper). E-paper is a kind of reflective display having excellent visual characteristics including a high resolution, a wide viewing angle, and a bright white background, like paper and ink. The e-paper may be formed on any substrate of a material such as plastic, metal, paper, etc. Since the e-paper can keep an image after power is off and does not require a backlight assembly, it lengthens the battery lifetime of the mobile terminal 200. The display 251 may be configured into e-paper using electrostatic-charged hemispherical twist balls, electrophoretic deposition, or microcapsules.

Besides, the display 251 may be configured into at least one of a Liquid Crystal Display (LCD), a thin film transistor-LCD, an Organic Light Emitting Diode (OLED) display, a flexible display, or a 3D display. Depending on implementation of the mobile terminal 200, the mobile terminal 200 may be provided with two or more displays 251. For example, both external and internal displays (not shown) may be mounted to the mobile terminal 200.

The audio output unit 253 outputs audio data received from the wireless communication module 210 or stored in the memory 260 in call termination mode, call mode, recording mode, voice recognition mode, or broadcast reception mode. The audio output module 253 also outputs an audio signal involved in a function performed by the mobile terminal 200, for example, an audio signal related to a call incoming sound, a message reception sound, etc. The audio output module 253 may include a speaker, a buzzer, etc.

The alarm emitter 255 outputs a signal notifying occurrence of an event to the mobile terminal 200. Events of the mobile terminal 200 include call signal reception, message reception, key signal input, etc. The alarm emitter 255 may output an event notification signal in a form other than an audio signal or a video signal. For example, the event notification signal may be output in the form of vibrations. Upon receipt of a call signal or a message, the alarm unit 255 may output a signal notifying the call signal or message reception. Upon receipt of a key signal, the alarm unit 255 may output a feedback signal for the key signal input. Thus, the user is aware of occurrence of an event from a signal output from the alarm unit 255. A signal notifying of occurrence of an event may also be output through the display 251 or the audio output module 253 in the mobile terminal 200.

The haptic module 257 generates various tactile effects that a user can feel. A major example of the tactile effects is vibrations. When the haptic module 257 generates vibrations as tactile effects, the intensity and pattern of the vibrations may be altered. The haptic module 257 may synthesize different vibration effects and output the synthesized vibrations. Alternatively or additionally, the haptic module 257 may output different vibration effects sequentially.

The haptic module 257 may provide various haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 257 may be configured to enable the user to recognize a haptic effect using the kinesthetic sense of the fingers or the arms. The mobile terminal 200 may include two or more haptic modules 257.

The memory 260 may store programs required for processing and controlling in the controller 280 or temporarily store input or output data (e.g. a phone book, messages, still images, videos, etc.).

The memory 260 may include at least one of a flash memory type storage medium, a hard disk type storage medium, a multimedia card micro type storage medium, a card type memory (e.g., a Secure Digital (SD) or eXtreme Digital (XD) memory), a Random Access Memory (RAM), or a Read-Only Memory (ROM). The mobile terminal 200 may operate a Web storage, which performs the storage function of the memory 260 on the Internet.

The interface 270 interfaces between the mobile terminal 200 and all external devices connected to the mobile terminal 200. The external devices may include a wired/wireless headset, an external charger, a wired/wireless data port, a memory card, a card socket such as a Subscriber Identification Module (SIM) card or a User Identity Module (UIM) card, an audio Input/Output (I/O) port, a video I/O port, an earphone, etc. The interface 270 may receive data or power from such an external device and transfer the data or power to each component of the mobile terminal 200. In addition, the interface 270 may transmit data from the mobile terminal 200 to the external device.

When the mobile terminal 200 is connected to an external cradle, the interface 270 may provide a path for supplying power from the external cradle to the mobile terminal 200 or for transmitting various user-input command signals from the external cradle to the mobile terminal 200.

The controller 280 typically provides overall control to the mobile terminal 200 by controlling the operation of each component. For example, the controller 280 controls and processes voice call, data communication, video call, etc. The controller 280 may include a multimedia player 281 for playing multimedia. The multimedia player 281 may be configured in hardware inside the controller 280 or in software separately from the controller 280.

The power supply 290 may receive power from an external power source or an internal power source and supply power to the other components of the mobile terminal 200.

The mobile terminal 200 having the above-described configuration may be configured to operate in communication systems capable of transmitting data in frames or packets, including a wired/wireless communication system or a satellite communication system.

If the camera 221 is the array camera 100 in the mobile terminal 200, the mobile terminal 200 does not need to redundantly include all components of the array camera 100 illustrated in FIG. 3. Thus it is obvious that components of the array camera 100 can be replaced with their counterparts of the mobile terminal 200.

For example, since the mobile terminal 200 includes the display 251, the mobile terminal 200 does not need to include an additional display for displaying the operation state of the array camera 100, a manipulated screen, a preview image, and a final image unless the additional display is specifically needed.

That is, the controller 180, the display 151, and the memory 160 of the array camera 100 may be replaced with the controller 280, the display 251, and the memory 260 of the mobile terminal 200. The mobile terminal 200 having an array camera of the present invention may operate in the manner described with reference to FIGS. 1 to 5.

Figure 7:
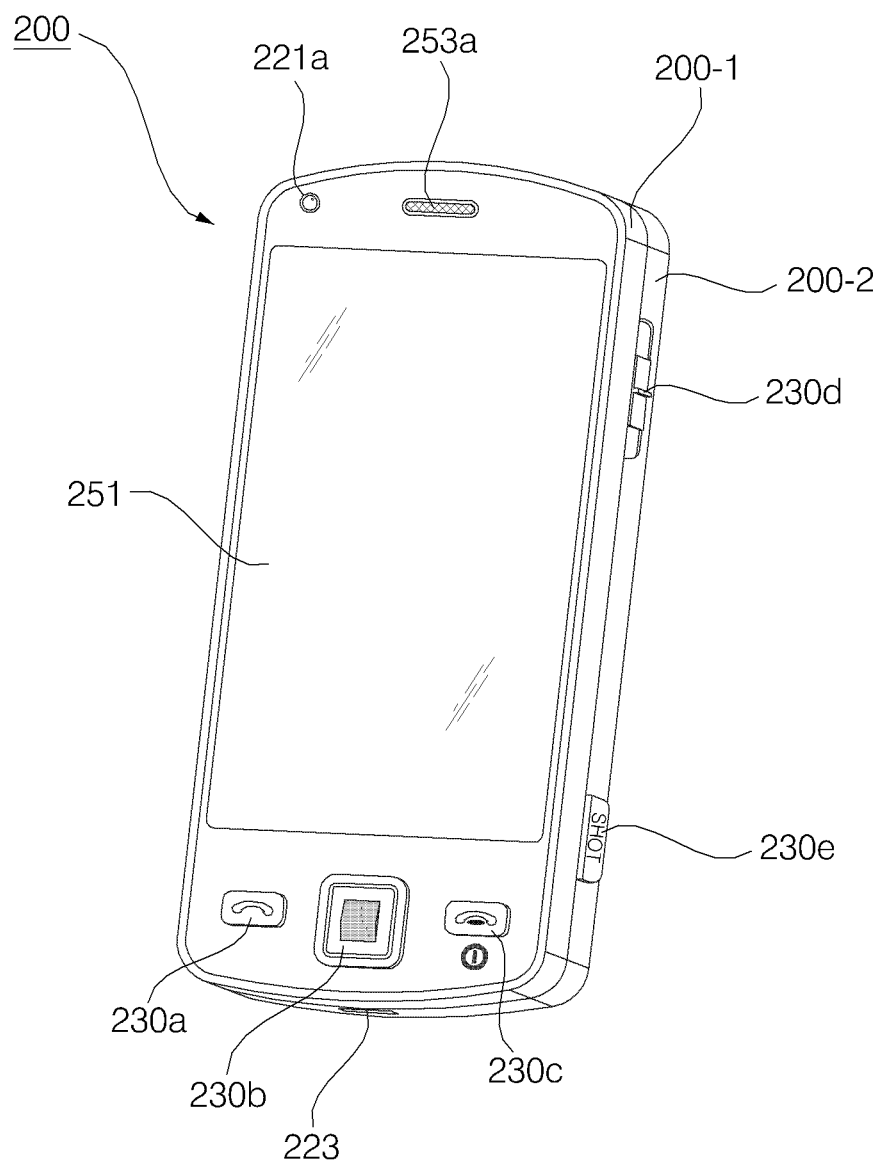
FIG. 7 is a front perspective view of the mobile terminal according to an embodiment of the present invention.
Figure 8:
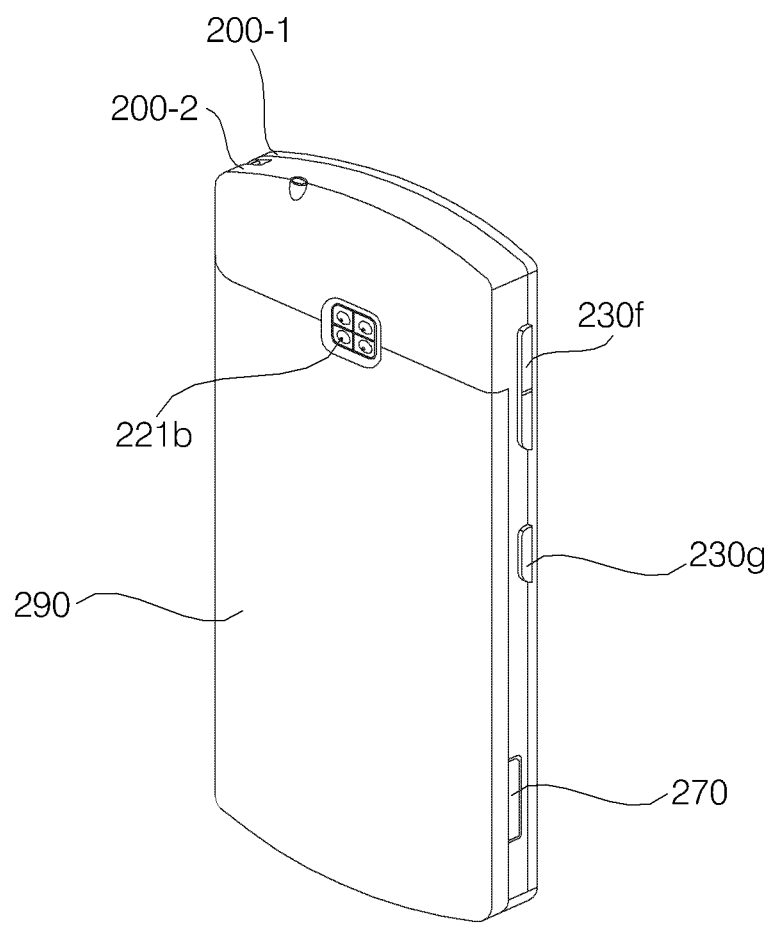
FIG. 8 is a rear perspective view of the mobile terminal according to an embodiment of the present invention.

FIG. 7 is a front perspective view of the mobile terminal according to an embodiment of the present invention and FIG. 8 is a rear perspective view of the mobile terminal illustrated in FIG. 7. With reference to FIGS. 7 and 8, the exterior of the mobile terminal will be described, centering on its exterior components. While the following description is given in the context of a bar-type mobile terminal having a front touch screen, it is purely exemplary. Thus it is to be understood that the present invention is also applicable to other types of mobile terminals including a folder type, a swing type, and a slider type.

Referring to FIG. 7, a front case 200-1 and a rear case 200-2 form the exterior case of the mobile terminal 200. A number of electronic parts are mounted in the space defined by the front case 200-1 and the rear case 200-2.

The display 251, a first audio output module 253a, a first camera 221a, and first, second and third user input units 230a, 230b and 230c may be disposed in a main body of the mobile terminal 200, particularly on the front case 200-1. Fourth and fifth user input units 230d and 230e and the microphone 223 may be disposed on side surfaces of the rear case 200-2.

If a touch pad is layered with the display 251, the display 251 may serve as a touch screen so that the user can enter various types of information to the mobile terminal 200 by touching the display 251.

The first audio output module 253a may be implemented as a receiver or a speaker. The first camera 221a may be configured to be suitable for capturing a still image or video of the user. The microphone 223 may be configured to properly receive the user's voice or other sounds.

The first to fifth user input units 230a to 230e and later-described sixth and seventh user input units 230f and 230g may be collectively referred to as the user input unit 230, and any means can be employed as the first to seventh user input units 230a to 230f so long as it can operate in a tactile manner.

For example, the user input unit 230 may be implemented as a dome switch or a touch pad that can receive a command or information according to a pressing or touch manipulation of the user, or may be implemented as a wheel or jog type for rotating a key or as a joystick. In terms of function, the first, second and third user input units 230a, 230b and 230c may operate as function keys for entering a command such as start, end, or scroll, the fourth user input unit 230d may operate as a function key for selecting an operation mode for the mobile terminal 200, and the fifth user input unit 230e may operate as a hot key for activating a special function within the mobile terminal 200.

Referring to FIG. 8, a second camera 221b may be additionally provided on the rear surface of the rear case 200-2, and the sixth and seventh user input units 230f and 230g and the interface 270 may be disposed on one side surface of the rear case 200-2.

The second camera 221b may have a shooting direction which is substantially the opposite to that of the first camera 221a, and may have a different resolution from that of the first camera 221a. A flash (not shown) and a mirror (not shown) may be additionally disposed in the vicinity of the second camera 221b.

To capture a 3D image, a third camera may further be installed near to the second camera 221b.

At least one of the first and second cameras 221a and 221b may be an array camera having a plurality of camera modules and may be capable of capturing a 3D image. Particularly, the second camera 221b may be an array camera.

When an image of an object is captured with the second camera 221b, the flash may illuminate the object. The mirror may allow the user to see himself or herself when he or she wants to capture his or her own image (self-picture taking) using the second camera 221b.

Another audio output module (not shown) may be additionally provided on the rear case 200-2. The audio output module on the rear case 200-2 may realize a stereo function along with the audio output module 253 on the front case 200-1. The audio output module on the rear case 200-2 may also be used in speaker-phone mode.

The interface 270 may be used as a passage allowing the mobile terminal 200 to exchange data with an external device. A broadcast signal reception antenna (not shown) may be disposed at one side of the front or rear case 200-1 or 200-2, in addition to an antenna used for calls. The broadcast signal reception antenna may be installed such that it can be extended from the rear case 200-2.

The power supply 290 may be mounted in the rear case 200-2 to supply power to the mobile terminal 200. The power supply 290 may be, for example, a chargeable battery which can be detachably mounted to the rear case 200-2 for being charged.

The second camera 221b and the other elements have been described as provided in the rear case 200-2, to which the present invention is not limited.

Even though the second camera 221b is not provided, the first camera 221a may be configured to be rotatable and thus to capture an image in the shooting direction of the second camera 221b.

Figure 9:
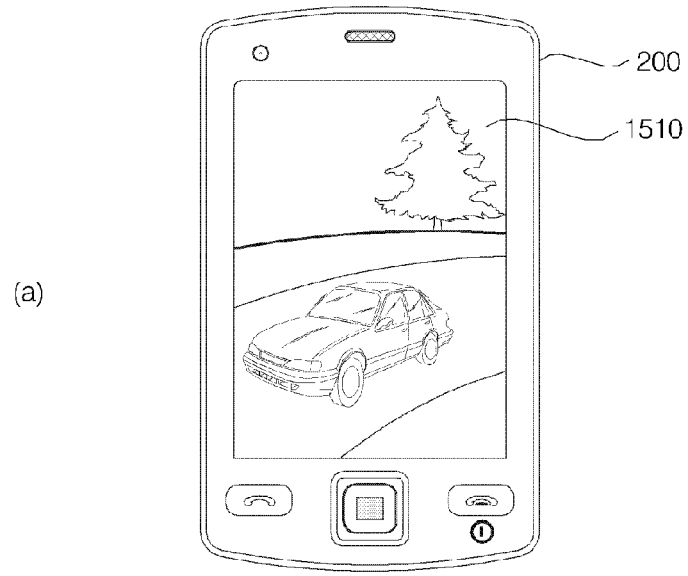
FIG. 9 is a view referred to for describing an example of capturing an image using the array camera.
Figure 9:
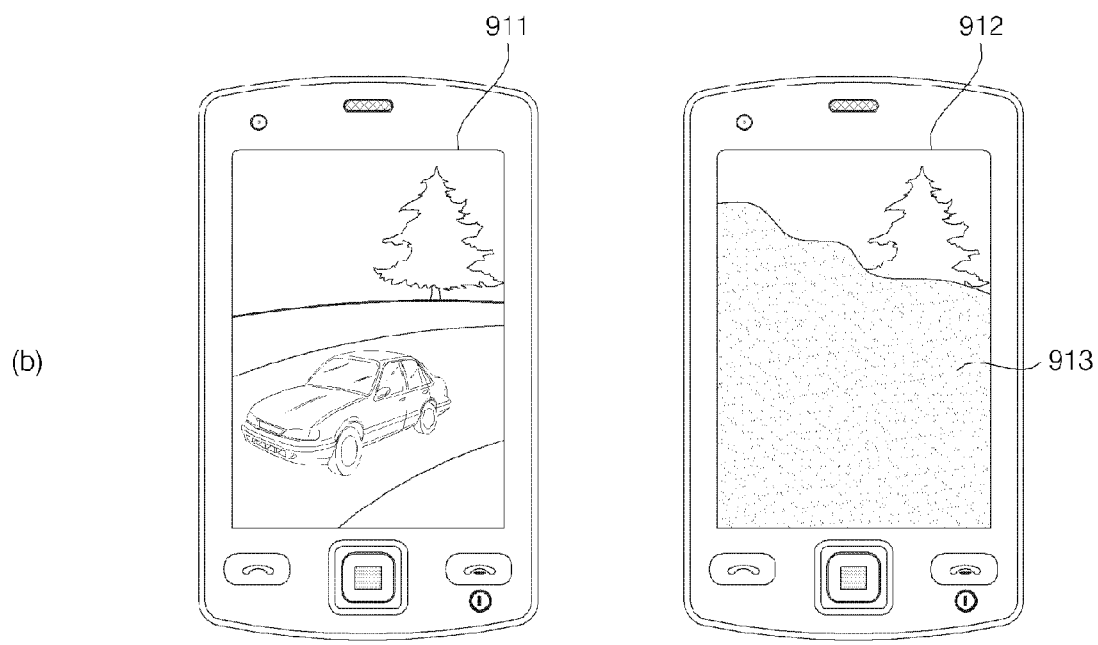

FIG. 9 is a view referred to for describing an example of capturing an image using the array camera.

As described before with reference to FIGS. 1 to 8, the array camera 100 and the mobile terminal 200 having the array camera 100 include a plurality of camera modules. Thus a plurality of images may be acquired from the plurality of camera modules and then combined into a composite image.

Referring to FIG. 9(a), when a user takes a picture using the array camera 100 or the mobile terminal 200 having the array camera 100, a preview image 1510 may be displayed on the display 151 or 251. Thus, the user may enter a capture command by checking the preview image 1510.

If the front of at least one of the plurality of camera modules is covered with a user's finger or an obstacle and thus is placed in a blind state, images acquired the plurality of camera modules may include a normal image 911 free of an error like blinding and an erroneous image 912 including a blind area 913 in which an object cannot be normally captured due to an obstacle such as a finger.

However, since the array camera includes a plurality of camera modules, a preview image may be generated from normal images unless a specific camera is in the blind state. Or in the case where a reference camera is set for a preview image, no problem occurs to generation and display of a preview image as far as the reference camera is normal.

Compared to a conventional camera with a single lens, the blind state of which is immediately noticeable to a user, it is difficult to determine whether a specific camera module has been covered in the array camera.

In this context, the present invention provides an array camera and a mobile terminal having the array camera, which can immediately indicate the blind state of a camera module to a user.

When the erroneous image 912 is combined with the normal image 911, the quality of the resulting composite image may be adversely affected.

Accordingly, the present invention provides an array camera and a mobile terminal having the array camera, which can acquire a high-quality image even though a camera module of the array camera is covered.

Figure 10:
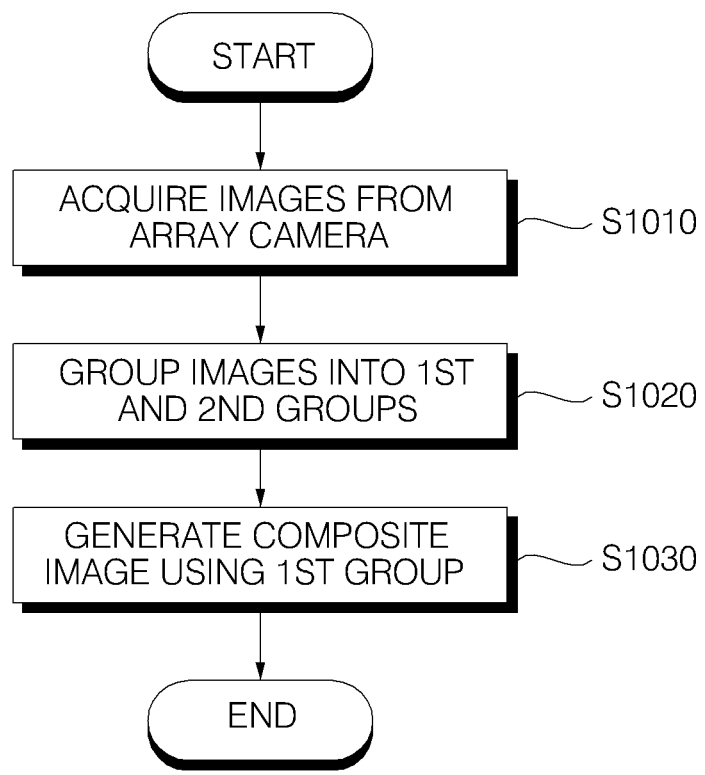
FIG. 10 is a flowchart illustrating a method for operating an array camera and a mobile terminal having the array camera according to an embodiment of the present invention.
Figure 11:
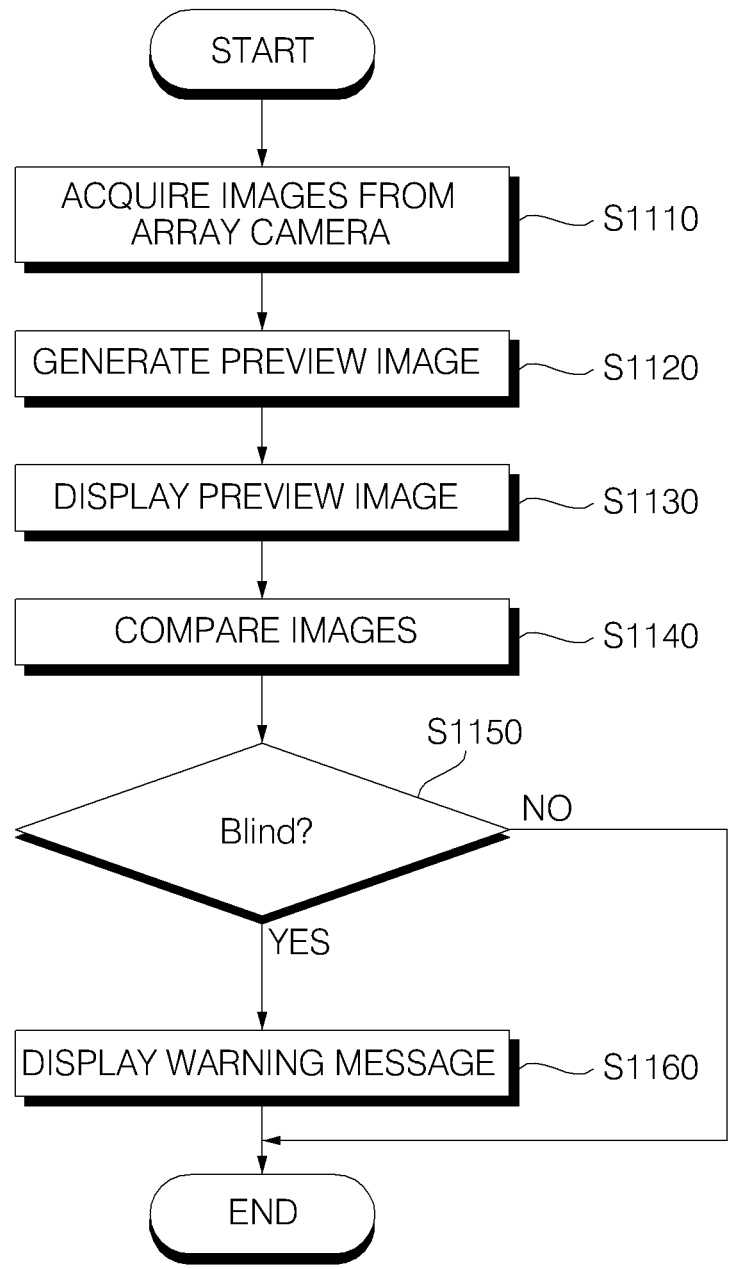
FIG. 11 is a flowchart illustrating a method for operating an array camera and a mobile terminal having the array camera according to another embodiment of the present invention.

FIGS. 10 and 11 are flowcharts illustrating methods for operating an array camera and a mobile terminal having the array camera according to embodiments of the present invention and FIGS. 12 to 18 are views referred to for describing an array camera, a mobile terminal, and methods for operating the array camera and the mobile terminal according to embodiments of the present invention.

Referring to FIG. 10, in accordance with a method for operating the array camera 100 and the mobile terminal 200 having the array camera 100 according to an embodiment of the present invention, images are acquired through a plurality of camera modules (S1010).

The images may be acquired by taking a picture or video in response to a user's capture command or by capturing a preview image when camera mode is placed.

The controller 180 or 280 groups the acquired images into a first group and a second group by comparing the images (S1020). The controller 180 or 280 may control generation of a composite image using the images of the first group (S1030).

Specifically, the controller 180 or 280 may analyze the acquired images and may classify images to be used for creating a final composite image as the first group, while classifying defective images resulting from wrong shots or erroneous images having blind areas as the second group in step S1020.

For example, the controller 180 or 280 may group images satisfying a predetermined criterion into the first group and group the other images into the second group, by comparing the acquired images on a pixel basis or on a predetermined area basis.

For instance, the controller 180 or 280 may analyze the histograms of the acquired images and determine whether their histogram distributions satisfy a predetermined criterion by comparing the histogram distributions.

The histograms may represent the pixel number distributions per pixel level of the images. The controller 180 or 280 may analyze the histograms of the acquired images. In this case, the histograms of the entire areas or part of the acquired images may be analyzed.

The controller 180 or 280 may calculate the brightness of each pixel in image data, count the numbers of pixels at respective brightness levels, convert the counts to a histogram, calculates a histogram distribution, and then detect images having different histogram distributions.

Or the controller 180 or 280 may extract the difference between images and determine whether the difference is within a predetermined range, may compare images on a pixel-by-pixel basis, or may compare images using the averages of M×N blocks.

Or the controller 180 or 280 may compare the acquired images on a pixel basis or on a predetermined area basis and thus may group images having the same feature point into the first group, while grouping the other images into the second group. The controller 180 or 280 may determine a specific object or point within an image as a feature point and determine whether each image includes the feature point.

The controller 180 or 280 may compare the feature points of the acquired images and may classify images having the same feature point or similar feature points as the first group, while classifying the other images having different feature points as the second group. The feature point may be key information such as a face recognizable by a face recognition algorithm.

Or the controller 180 or 280 may compare the acquired images on a pixel basis or on a predetermined area basis and may classify images including a black area with a predetermined number of or more pixels as the second group, while classifying the other images as the first group. In this case, the controller 180 or 280 may identify a blind state fast by focusing on detection of the blind state.

Meanwhile, if a reference camera module is preset for a preview image, the user may view an image acquired by the reference camera module as a preview image and thus may immediately determine whether the preview image is defective.

If a problem occurs to the array camera 100, a warning message may be displayed on the display 151 or 251. Meanwhile, the controller 180 or 280 may control output of an alarm sound and/or vibration in addition to the warning message.

In this case, the user can readily identify a defective state such as a blind state from a preview image. Thus the user can retry to take a picture or take an action of removing a finger that covers a camera module.

For grouping the acquired images, the controller 180 or 280 may set an image acquired by the reference camera module as a reference image. Then the controller 180 or 280 may compare the reference image with the images acquired by the other camera modules and may classify images satisfying a predetermined criterion in the comparison as the first group, while classifying the other images as the second group.

Meanwhile, various known image recognition techniques are available to the comparison between the image acquired by the reference camera module and the images acquired by the other camera modules.

Subsequently, the controller 180 or 280 may control creation of a composite image using the images of the first group in step S1030. In accordance with an embodiment of the present invention, a high-quality image can be acquired by creating a final image by combining only the images of the first group satisfying a predetermined criterion.

Or the controller 180 or 280 may generate an interpolated image using the images of the first group and create a final image by combining the interpolated image with the images of the first group.

That is, the method for operating an array camera and a mobile terminal having the array camera according to the embodiment of the present invention further includes generation of an interpolated image as a substitute for an image of the second group, using the images of the first group. Thus in the composite image generation step S1030, a composite image is created by combining the images of the first group with the interpolated image.

The composite image and/or the images of the first group may be stored in the memory 160 or 260.

Referring to FIG. 11, in accordance with a method for operating the array camera 100 and the mobile terminal 200 having the array camera according to another embodiment of the present invention, images are acquired through a plurality of camera modules (S1110).

The controller 180 or 280 may generate a preview image based on an image captured by a reference camera module among the plurality of camera modules (S1120) and may control display of the preview image on the display 151 or 251 (S1130).

The controller 180 or 280 may perform image processing to display the image acquired through the reference camera module as a preview image. For example, the controller 180 or 280 may perform an image correction operation based on the differences among the acquired image, the display 151 or 251, and a preview image display condition in terms of resolution and scaling.

Alternatively or additionally, the controller 180 or 280 may control display of the image acquired through the reference camera module as a preview image without any special image processing.

The controller 180 or 280 may compare the image acquired through the reference camera module with the images acquired through the other camera modules (S1140) and may detect a blind-state camera module based on the comparison (S1150).

Upon detection of a camera module in the blind state (S1150), the controller 180 or 280 may control display of a warning message on the display 151 or 251 (S1160). In addition, the controller 180 or 280 may control output of an alarm sound and/or vibration along with the warning message.

Images are acquired through the plurality of camera modules in response to reception of a capture command input from the user. The user may remove a finger from a camera module, viewing the warning message displayed on the display 151 or 251 and then enter the capture command. In this case, it is highly likely that error-free images are acquired from all of the camera modules.

The memory 160 or 260 may store the images acquired from the plurality of camera modules.

Despite the warning message, the user may just enter a capture command without taking any special action.

In this case, the method for operating an array camera and a mobile terminal having the array camera according to the embodiment of the present invention may further include generation of an interpolated image as a substitute for the image acquired through the blind-state camera module, based on the images acquired through the camera modules other than the blind-state camera module and generation of a composite image by combining the interpolated image with the images acquired through the camera modules other than the blind-state camera module.

That is, the controller 180 or 280 may generate an interpolated image using the other images by various known image combining techniques including virtual view synthesis in order to substitute for the erroneous image captured by the blind-state camera module.

The controller 180 or 280 may generate a depth map using the other images and use the depth map in the virtual view synthesis. For example, the controller 180 or 280 may use multiple baseline stereo. According to the multiple baseline stereo scheme, depth information is extracted by comparing the images acquired from the plurality of camera modules and taking points with less errors (or less differences) as corresponding points, and then a depth map is generated using the depth information. A substitute image may be created from the depth information using triangulation.

The controller 180 or 280 may also control display of the composite image on the display 151 or 251 or storage of the composite image in the memory 160 or 260.

The method for operating an array camera and a mobile terminal having the array camera according to the embodiment of the present invention may further include creating a composite image by combining the other images except for the image acquired through the blind-state camera module. The controller 180 or 280 may also control display of the composite image on the display 151 or 251 or storage of the composite image in the memory 160 or 260.

The embodiment illustrated in FIG. 11 is different partially from the embodiment illustrated in FIG. 10, in that a preview image is considered.

However, the embodiments of the present invention are common in that an erroneous image is detected by comparing images acquired from a plurality of camera modules in the array camera and a final composite image is created by combining the other images except for the erroneous image or a substitute image is created using the other images and a final composite image is created by combining the other images with the substitute image.

Therefore, the present invention can acquire a high-quality image by acquiring various images from a plurality of camera modules and combining the images. In addition, it is easily determined whether a camera module has been covered and thus a user can retry to take a picture or try to capture an object after solving the problem. Since a high-quality image can be obtained using the other images with a camera module covered, user convenience can be increased.

FIGS. 12 to 18 are views referred to for describing the embodiments of the present invention described with reference to FIGS. 10 and 11.

While the array camera 100 includes six camera modules 1211 to 1216 and acquires five images simultaneously through the six camera modules 1211 to 1216 in FIGS. 12 to 18, this configuration is purely exemplary and thus should not be construed as limiting the present invention.

Figure 12:
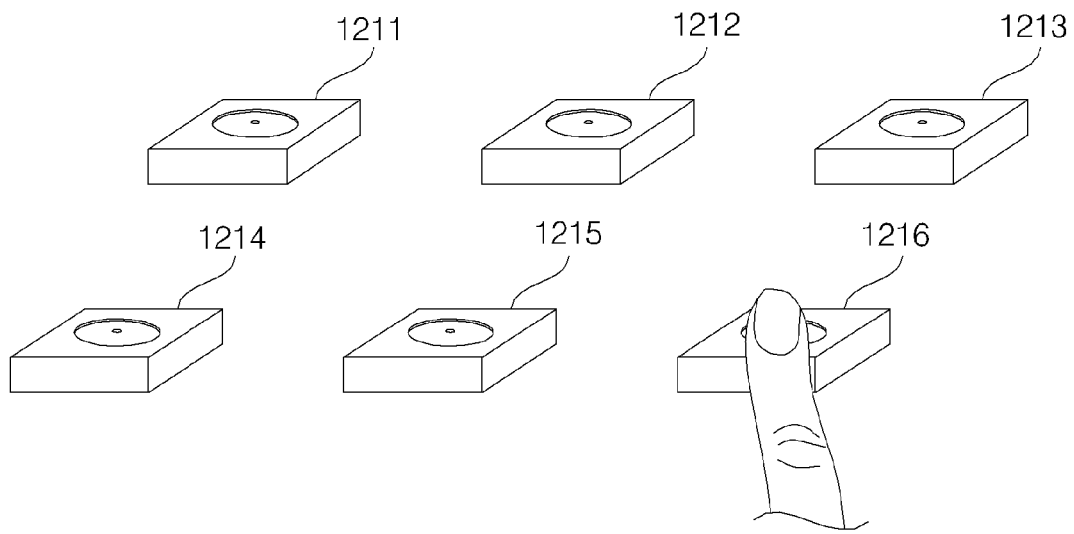
FIGS. 12 to 18 are views referred to for describing an array camera, a mobile terminal, and methods for operating the array camera and the mobile terminal according to embodiments of the present invention.
Figure 13:
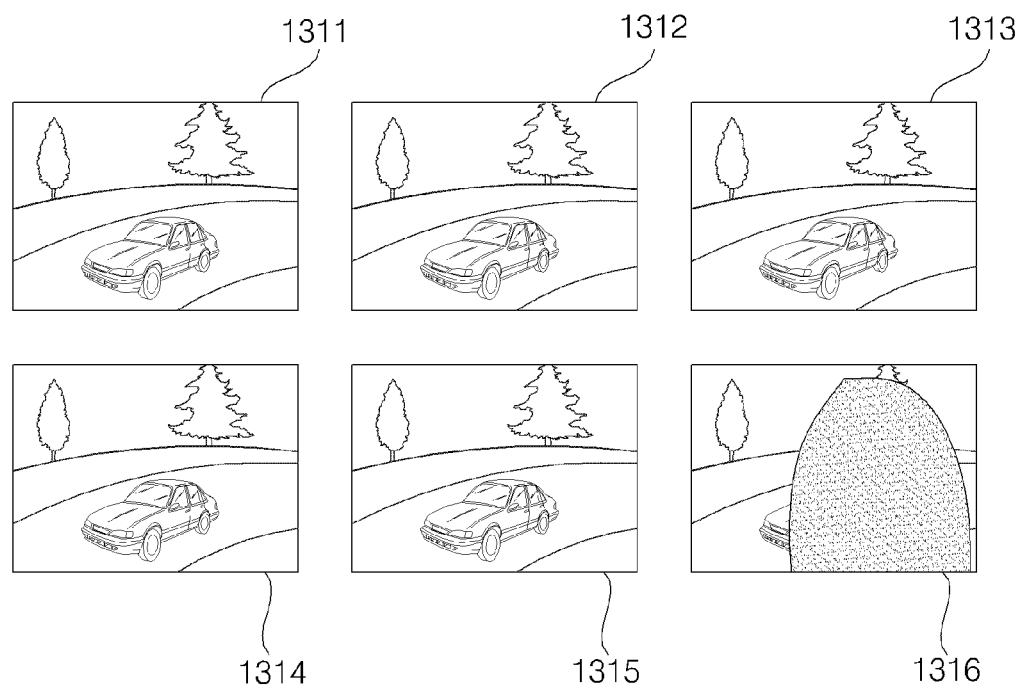

Referring to FIG. 12, when the user covers at least one 1216 of the plurality of camera modules 1211 to 1216 with the user's finger, video frames of a video or images illustrated in FIG. 13 may be acquired through the camera modules 1211 to 1216.

Referring to FIG. 13, it is noted that an image 1316 acquired from the blind-state camera module 1216 covered by the user's finger is significantly different from images 1311 to 1315 acquired from the other camera modules 1211 to 1215.

The controller 180 or 280 may compare the acquired images on a pixel or predetermined area basis and thus may classify images satisfying a predetermined criterion into the first group, while classifying the other images into the second group. The controller 180 or 280 may determine images greatly different from the other images to be second-group images, while determining the other similar images to be first-group images.

Or if the specific camera module 1211 is set as a reference camera, the controller 180 or 280 may compare the image 1311 acquired from the reference camera module 1211 corresponding to a preview image with the other images 1312 to 1316 and may determine images very different from the preview image to be second-group images.

Figure 14:
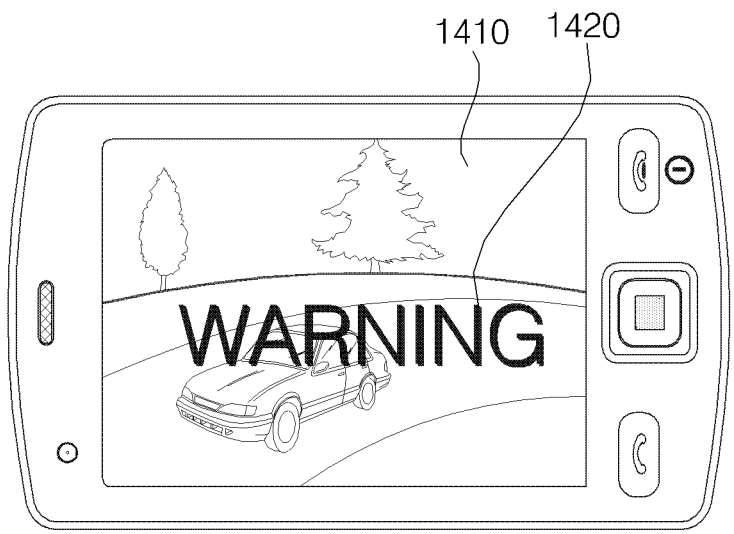
Figure 15:
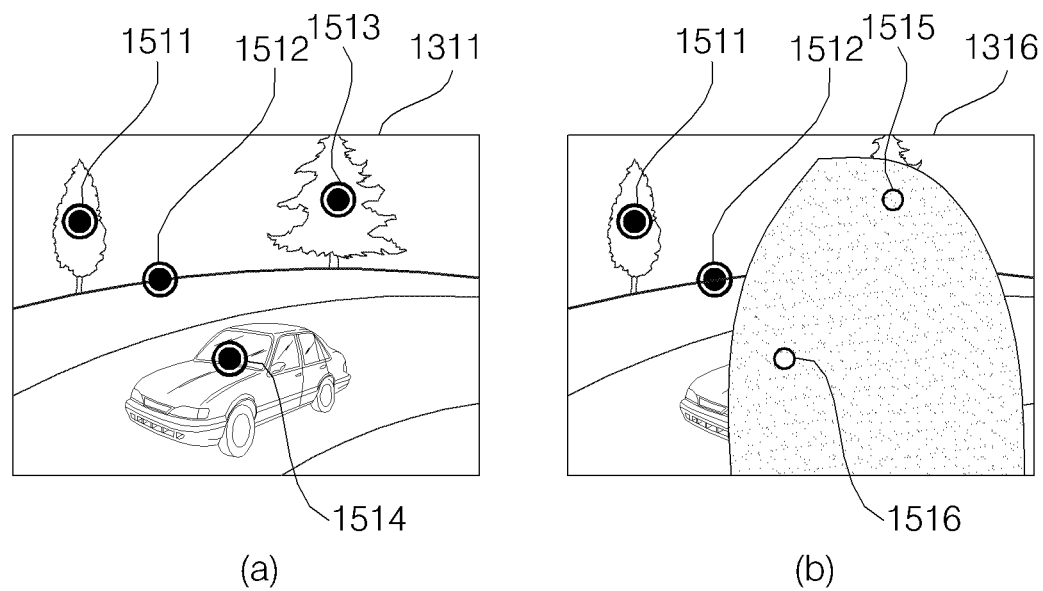
Figure 16:
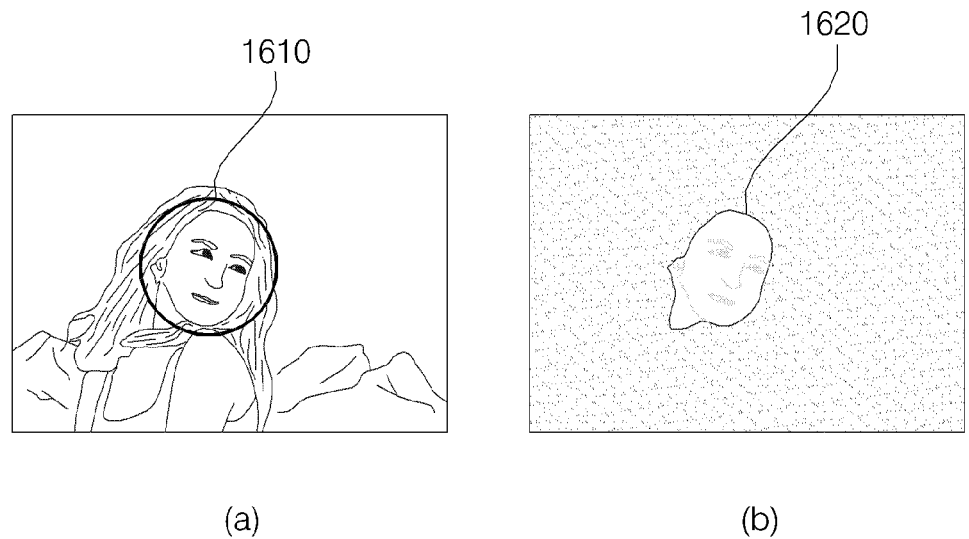

Meanwhile, upon sensing a second-group image, that is, an erroneous image including a specific error like blinding, the controller 180 or 280 may control display of a warning message 1420 over a preview image 1410 as illustrated in FIG. 14.

The controller 180 or 280 may further display the warning message 1420 along with the identification number of the camera module that has acquired the erroneous image, to thereby provide helpful information to the user so that the user can solve the problem.

The controller 180 or 280 may also help the user to readily identify a shot state by controlling output of a sound effect and/or a vibration effect along with the warning message 1420.

Meanwhile, the controller 180 or 280 may extract the histogram analysis results of the images or the differences of the images, determine whether the differences are equal to or smaller than a predetermined value, and then classify the images into the first and second groups based on the determination.

Or the controller 180 or 280 may compare the acquired images on a pixel or predetermined area basis and thus may classify images having the same feature point into the first group, while classifying the other images into the second group.

The controller 180 or 280 may determine a plurality of specific objects or points detected by comparing a plurality of images or specific objects or points detected with respect to an image acquired from the reference camera module, as feature points 1511 to 1514.

The controller 180 or 280 may determine whether each image includes the feature points 1511 to 1514.

FIG. 15(a) illustrates the exemplary feature points 1511 to 1514 extracted from the image 1311 acquired through the reference camera module 1211. FIG. 15(b) illustrates the exemplary image 1316 acquired through the blind-state camera module 1216. The image 1316 includes the feature points 1511 and 1512 with feature points 1515 and 1516 covered in a blind area.

Or the controller 180 or 280 may compare images using an object recognition technique such as a face recognition algorithm, a character recognition algorithm, etc. as a key. FIGS. 16(a) and 16(b) illustrate recognition and non-recognition of a face in a captured image, respectively. A blurry image 1620 from which face recognition is difficult, resulting from inaccurate capturing of an object's face 1610 may be classified into a second-group image and thus excluded from creation of a final image.

In the present invention, only images received from the other camera modules except for a defective camera module may be provided to a user.

The controller 180 or 280 may generate a final image by combining the images 1311 to 1315 acquired through the other camera modules except for the second-group image 1316.

Figure 17:
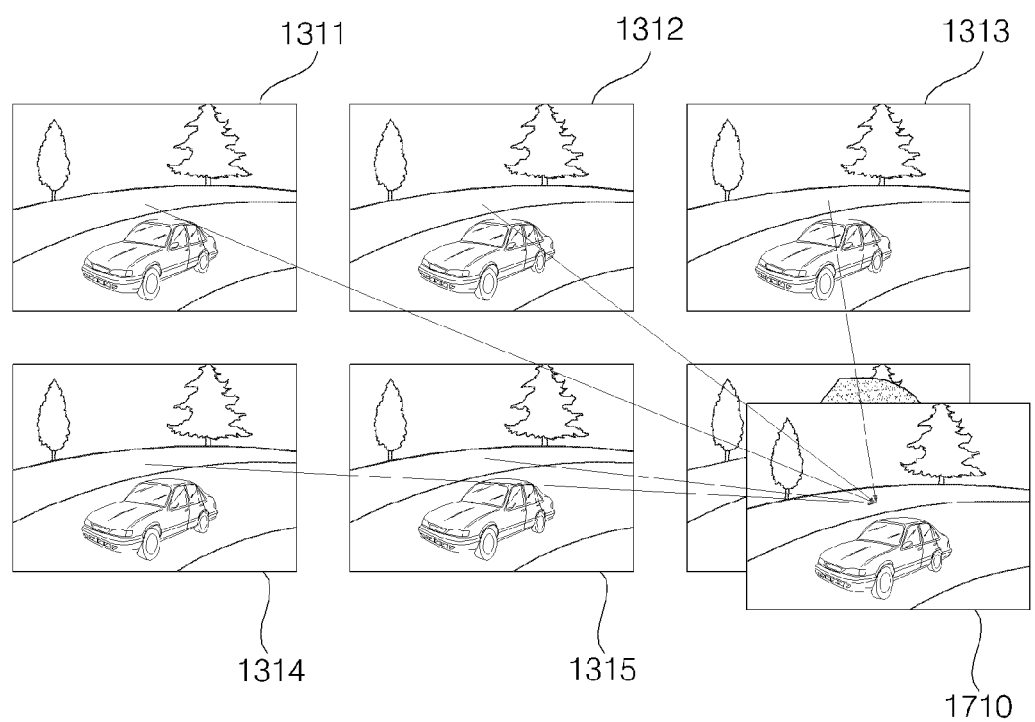
Figure 18:
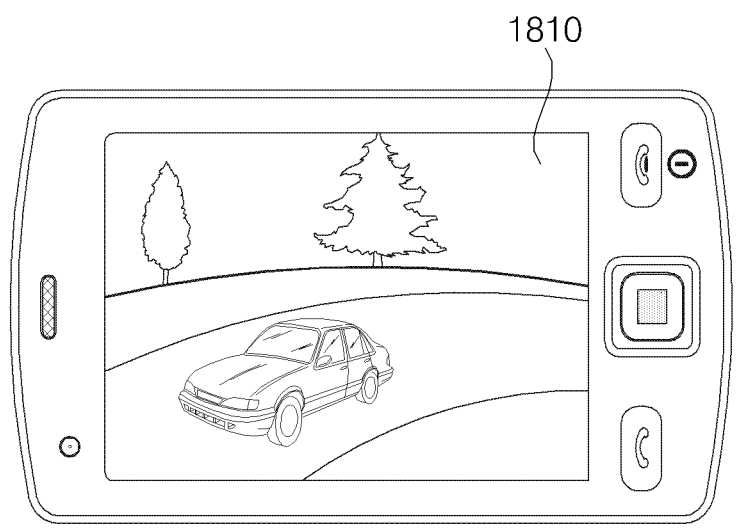

In another embodiment of the present invention, the controller 180 or 280 may generate an image 1710 to substitute for the image 1316 by combining the images 1311 to 1315 acquired through the other camera modules as illustrated in FIG. 17 and may create a final image 1810 by combining the substitute image 1710 with the first-group images 1311 to 1315, as illustrated in FIG. 18.

An array camera and a mobile terminal having the array camera according to the present invention include a plurality of camera modules.

Even though at least one of the camera modules is covered or has a defect, no problem may occur to generation and display of a preview image.

It may be determined whether a specific camera module is abnormal by comparing the acquired images. Upon detection of an abnormal camera module, the user may be notified that there is a problem with the array camera.

When the erroneous image is combined with other images, the erroneous image may adversely affect the quality of a final composite image.

Therefore, only the images of the other camera modules except for the defective camera module are provided to the user or the view of the defective camera module is generated based on the images of the other camera modules and then combined with the images into a composite image. Thus, image quality can further be enhanced.

The array camera, the mobile communication terminal, and the methods for operating the same according to the foregoing exemplary embodiments are not restricted to the exemplary embodiments set forth herein. Therefore, variations and combinations of the exemplary embodiments set forth herein may fall within the scope of the present invention.

The present invention may be implemented as code that can be written on a computer-readable recording medium and thus read by a processor in the array camera and the mobile terminal. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission over the Internet). The computer-readable recording medium can be distributed over a plurality of computer systems connected to a network so that computer-readable code is written thereto and executed therefrom in a decentralized manner. Programs, code, and code segments to realize the embodiments herein can be construed by one of ordinary skill in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A method for operating an array camera having a plurality of camera modules, the method comprising:
   acquiring images through the plurality of camera modules;
   grouping the acquired images into a first group and a second group by comparing the acquired images;
   generating an interpolated image using the images of the first group to substitute for an image of the second group; and generating a composite image using images of the first group, wherein the generating of the composite image includes generating the composite image by combining the images of the first group with the interpolated image.

2. The method according to claim 1, wherein the grouping includes comparing the acquired images on a pixel-by-pixel basis or on a predetermined area-by-predetermined area basis, grouping images satisfying a predetermined criterion into the first group, and grouping the other images into the second group.

3. The method according to claim 1, wherein the grouping includes comparing the acquired images on a pixel-by-pixel basis or on a predetermined area-by-predetermined area basis, grouping images including a same feature point into the first group, and grouping the other images into the second group.

4. The method according to claim 1, wherein the grouping includes comparing the acquired images on a pixel-by-pixel basis or on a predetermined area-by-predetermined area basis, grouping images including a black area with a predetermined number of or more pixels into the second group, and grouping the other images into the first group.

5. The method according to claim 1, further comprising storing the generated composite image.

6. The method according to claim 1, further comprising storing the images of the first group.

7. A method for operating a portable terminal having an array camera with a plurality of camera modules, the method comprising:
   acquiring images through the plurality of camera modules;
   grouping the acquired images into a first group and a second group by comparing the acquired images;
   generating an interpolated image using the images of the first group to substitute for an image of the second group; and
   generating a composite image using images of the first group, wherein the generating of the composite image includes generating the composite image by combining the images of the first group with the interpolated image.

8. The method according to claim 7, further comprising storing the generated composite image.

9. A method for operating an array camera having a plurality of camera modules, the method comprising:
   acquiring images through the plurality of camera modules;
   generating a preview image using an image acquired through a reference camera module among the plurality of camera modules;
   displaying the preview image on a display;
   detecting a blind-state camera module by comparing the image acquired through the reference camera module with images acquired through the other camera modules;
   displaying a warning message on the display, upon detection of the blind-state camera module;
   acquiring images through the plurality of camera modules in response to reception of a user's capture command input;
   generating an interpolated image using the images acquired through the camera modules other than the blind-state camera module, to substitute for the image acquired through the blind-state camera module; and
   generating a composite image by combining the interpolated image with the images acquired through the camera modules other than the blind-state camera module.

10. The method according to claim 9, further comprising storing the images acquired through the plurality of camera modules.

11. The method according to claim 9, further comprising displaying the composite image on the display.

12. A method for operating a mobile terminal having an array camera with a plurality of camera modules, the method comprising:
   acquiring images through the plurality of camera modules;
   generating a preview image using an image acquired through a reference camera module among the plurality of camera modules;
   displaying the preview image on a display;
   detecting a blind-state camera module by comparing the image acquired through the reference camera module with images acquired through the other camera modules;
   displaying a warning message on the display, upon detection of the blind-state camera module;
   acquiring images through the plurality of camera modules in response to reception of a user's capture command input;
   generating an interpolated image using the images acquired through the camera modules other than the blind-state camera module, to substitute for the image acquired through the blind-state camera module; and
   generating a composite image by combining the interpolated image with the images acquired through the camera modules other than the blind-state camera module.

* * * * *